Patented Nov. 13, 1945

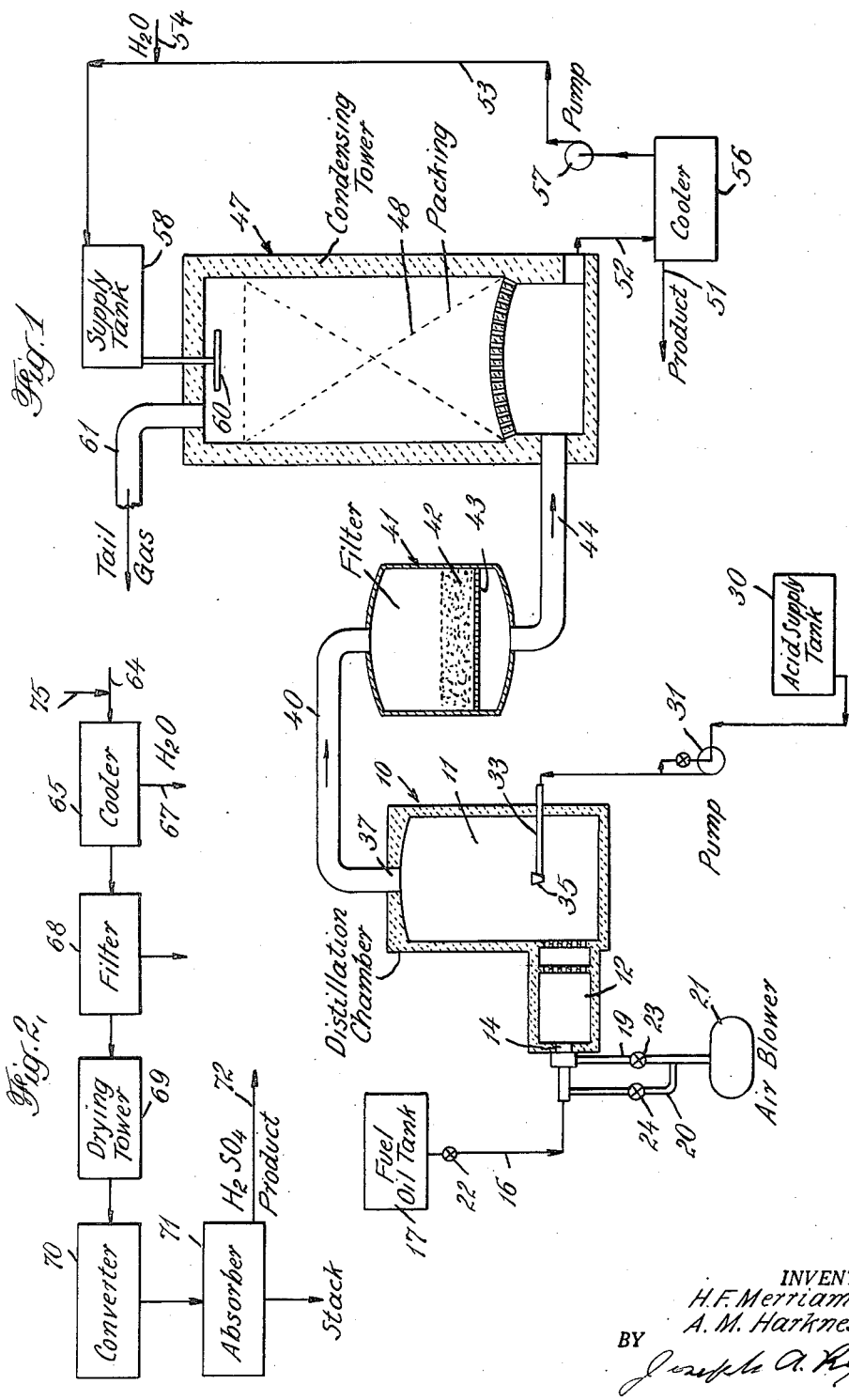

2,389,070

UNITED STATES PATENT OFFICE 2,389,070

MANUFACTURE OF SULPHURIC ACID

Henry F. Merriam, West Orange, N. J., and Andrew M. Harkness, Nyack, N. Y., assignors to General Chemical Company, New York, N. Y., a corporation of New York Application October 8, 1942, Serial No. 461,292

5 Claims. (Cl. 23—172)

This invention is directed to manufacture of commercial sulphuric acid from sulphuric acid which, by reason of its $H_2SO_4$ concentration or impurity content or both, is unsuitable for general use. More particularly, the invention relates to production of commercial sulphuric acid from spent or waste sulphuric acid containing organic impurities.

It has been proposed to recover, as sulphuric acid, the sulphur values of sulphuric acid which is dilute and contains organic impurities by decomposing such acid to form $SO_2$ gas, purifying the gas, drying, and catalytically oxidizing $SO_2$ to $SO_3$ which is then absorbed in sulphuric acid in usual $SO_3$ absorption systems. It has also been suggested to subject similar impure acids to a so-called distillation operation in which the acid is vaporized and the $H_2SO_4$ constituent is more or less dissociated to form an $SO_3$ gas-water vapor mixture which is then cooled to effect union of $SO_3$ and water to form liquid sulphuric acid. The present invention relates to improvements in this latter type of process.

Prior conventional methods directed to production of sulphuric acid by the distillation of certain types of sulphuric acid and cooling or condensation of the resulting $SO_3$-water vapor mixture have not become of any commercial importance for certain reasons. First, in the case of acids containing organic impurities, it has not been possible to obtain a condensed product acid of good color and satisfactorily low organic impurity content. Further, manipulative procedures of previous processes have been of the character that a large part of the sulphur of the initial acid was converted to $SO_2$ as a result of excessive dissociation or reduction of $SO_3$ to $SO_2$. This feature gives rise to two situations. The first is low yield of condensed $H_2SO_4$ and formation of a condenser tail gas so high in $SO_2$ that discharge to the atmosphere is not possible. The alternate has been to utilize the high $SO_2$ tail gas in a catalytic oxidation system. But even in this instance, $SO_3$ dissociation in the distillation stage is so high and condensed sulphuric acid yield so low that it has not been economically feasible to operate a distillation and condensation unit in conjunction with a catalytic $SO_2$ oxidation plant. Where the initial acid has contained organic impurities, manufacture of sulphuric acid product satisfactory as to color has not been secured for the reason that prior methods do not adequately provide for the conversion of organic impurities to non-deleterious forms. Low yields of condensed $H_2SO_4$ result from a lack of knowledge in the art as to how to vaporize or dissociate the initial impure acid to $SO_2$ and water without at the same time effecting a large degree of dissociation of $SO_3$ to $SO_2$ and oxygen.

One of the principal objects of the invention is to provide a distillation procedure by which dissociation of $SO_3$ to $SO_2$ and oxygen is cut down to such an extent that formation of $SO_2$ is minimized and the condensed sulphuric acid yield obtained is well within the commercial demands. A further objective is provision of a process by which sulphuric acid of commercially acceptable color and purity may be made by distillation and condensation of $SO_3$ and water components of waste acids initially containing organic impurities and other impurities such as iron and aluminum. Another particular aim is provision of a distillation process according to which $SO_3$ dissociation may be held so low that the $SO_2$ content of the condenser tail gas is so small that such tail gas requires no further processing, thus affording the important advantage that the distillation and condensation equipment may be operated as a unit independent of additional process steps to recover $SO_2$ and sulphuric acid out of the condenser tail gas. It is also an object of the invention to provide a distillation procedure facilitating such high yield of condensed $H_2SO_4$ product that the distillation and condensation unit may be operated economically along with an $SO_2$ contact plant if desired.

The invention, its more particular objects and advantages may be understood from the following description taken in connection with the accompanying drawing diagrammatically showing in Fig. 1 apparatus in which a preferred embodiment of the invention may be carried out, and in Fig. 2 contact plant apparatus which, according to a modification, may be used in conjunction with the apparatus of Fig. 1.

Referring to Fig. 1, 10 indicates a brickwork furnace providing a cylindrical, preferably vertically elongated distillation or reaction chamber 11. Communicating with the lower end of the reaction chamber is a combustion chamber 12 equipped with a burner 14 connected thru pipe 16 with an oil or other fuel supply tank 17 and by pipes 19 and 20 with an air blower 21, pipes 16, 19 and 20 having control valves 22, 23 and 24. The combustion chamber and associated burner and accessories may be of any satisfactory design which insures substantially complete combustion of fuel in chamber 12 prior to introduction of combustion gases into chamber 11.

Acid to be treated is withdrawn from tank 30 by pump 31 and injected into the reaction chamber thru a suitable inlet pipe 33 having an upwardly directed spray nozzle 35 on the outlet end. As indicated on the drawing, the nozzle is sufficiently above the bottom of the chamber as to be well within the stream of incoming combustion gas.

The gas-vapor mixture formed in chamber 11 is discharged thru outlet 37, and passes thru conduit 40 into a casing 41 containing a body of filtering material 42 supported by a grille 43. The filtered gas-vapor mixture flows thence thru pipe 44 into any suitable known type of condensing apparatus. In the embodiment shown, the condenser consists of a tower 47 containing suitable packing 48 which, in the case of manufacture of condenser acid of strength in excess of 62–62 Bé., may be fused silica. Associated with the tower is a liquor circulating system comprising pipe connections 51, 52, 53, and 54, cooler 56, pump 57, supply tank 58 and distributor head 60 designed to effect uniform distribution of liquid over the top of the tower packing. Uncondensed gases and vapors are discharged from the condenser thru pipe 61.

In preferred practice, sulphuric acids which may be used as sources of ultimate product acid are preferably more or less dilute impure acids such as denitrated spent sulphuric acids from manufacture of nitrated organic compounds. Organic impurities in acids of this nature are mostly in the form of ether soluble organic compounds. Such suitable acids are dark-colored spent sulphuric acids formed as by-products in manufacture of trinitrotoluene, typical samples of which may analyze 65–93% $H_2SO_4$; 0.02–0.05% iron as sulphate; 0.02–0.05% aluminum as sulphate; water; and contain 0.6–0.02% of ether soluble organic bodies. In denitrated spent acids of this type, the organic impurities, determined as carbon, usually do not exceed 0.2%. (All quantities by weight.) Acids from other sources may be treated. However, we find it important to use acids having organic impurity content not exceeding 1.5% (by weight) determined as carbon, since by so doing good yields of condensed product acid are obtained.

Practice of the invention involves disseminating sulphuric acid in a reaction zone, directly contacting disseminated acid with a suitable heating gas containing free oxygen and heated so as to maintain temperatures in the reaction zone high enough to insure acid dissociation, preferably not less than 900° F. in the case of starting acids containing appreciable amount of organic impurity, and in any situation not in excess of 1400° F.; to thereby dissociate the acid, also convert any organic impurities present to non-deleterious condition and produce gaseous reaction products containing $SO_3$ and water vapor, and cooling the gaseous reaction products to effect union of $SO_3$ and water to form commercially acceptable sulphuric acid.

We have found that distillation or vaporization of the starting acid should be carried out according to certain procedural features which are of interdependent importance. The first of these is relatively thorough dissemination or distribution of the usually impure acid in the distillation or vaporization zone. Although satisfactory acid dissemination may be effected in any mechanically suitable way, it is desirable to inject the acid into the reaction chamber in the form of a spray, the type of spray nozzle employed being such as to break up incoming acid into particles as fine as operatively feasible. When working with a spent nitrating acid of the type described, while actual organic impurity content is low, experience obtained in previous attempts to eliminate hydrocarbon impurities from such acids shows that these impurities are refractory and difficult to convert to non-deleterious form such as carbon dioxide. We find that one feature needed to facilitate satisfactory oxidation of organic impurities is formation in the reaction chamber of a good dispersion or suspension of the liquid acid particles so that the relatively small amount of organic impurities may be well distributed throughout the distillation zone. Whatever the specific manner of acid injection may be, introduction of the acid should be such as to prevent formation in the reaction chamber of pools of liquid of any appreciable size. With this feature in view, the spray head may be placed at any convenient location, although it is preferred to direct the acid spray upwardly from a point spaced sufficiently from the bottom of the reaction chamber so that incoming combustion gas stream envelopes the acid spray at its base. Upward injection of acid facilitates increase of the time interval of suspension of a spray particle to such an extent that any particular globule of acid becomes vaporized before it has a chance to drop back onto the bottom of the reaction chamber. Hence the type of spray nozzle, location of the same in the reaction chamber, quantity of acid and pump pressure effecting injection are all chosen so as to thoroughly disseminate the acid particles and maintain such particles in suspension long enough to cause vaporization by the hot combustion gases.

Another features of importance in practicing the process is to subject the acid being treated to temperatures well above the boiling point of sulphuric acid. This is accomplished by carrying out the distillation operation by direct contact of acid and hot combustion gas.

Two factors, upon which high yield and production of clean condensed acid from impure acid depend, are respectively minimization of dissociation of $SO_3$ to $SO_2$ and oxidation of organic impurities to non-deleterious form. To secure these results we find that, in conjunction with dissemination of acid and direct contact of acid and hot gas, further preferred procedural control features of importance are temperature and composition of the particular heating gas used to effect distillation or vaporization of the starting acid. Our experience shows that high yield of condensed product acid is closely related to heating gas composition and that oxidation of organic impurities to non-deleterious form is more directly related to temperature conditions maintained in the distillation zone by the heating gas.

Either of two general types of combustion gas may be used as the heating agent, whichever gas selected depending upon whether it is desired to operate the distillation and condensation stages as an independent plant unit or in conjunction with a catalytic $SO_2$ oxidation plant. Types of heating gas which may be employed are first combustion gases produced by burning of carbonaceous fuels such as fuel oil and natural gas, and second, combustion gases formed by burning of sulphur bearing materials such as brimstone and $H_2S$ gas, for example the strong $H_2S$ gas obtained as a by-product of treatment of cracking still gases in the petroleum refining industry. Combustion gases of both kinds are characterized by the presence of a readily controllable free oxygen content. However, combustion gas formed by the burning of carbonaceous fuels are, as far as this invention is concerned, practically non-sulphurous and contain no appreciable $SO_2$, while on the other hand combustion gas resulting from burning of the indicated sulphurous materials contain substantial quantities of $SO_2$.

We have found that by employing a substantially non-sulphurous combustion gas of certain composition, in the case of a starting acid containing organic impurities, we are enabled to form clear or substantially clear condensed acid product, and minimize $SO_3$ dissocation to such an extent that the tail gas of the condenser contains so little $SO_2$ that it is unnecessary to further process such tail gas for residual $SO_2$ extraction, thus affording the important commercial advantage that the distillation and condensation stages may function as an independent plant unit.

When using substantially non-sulphurous heating agent, formation of such combustion gas of hereindisclosed temperatures and compositions may be effected in any suitable way, and the specific manner of producing such combustion gas of desired composition and temperature is a matter of burner operating practice. Regardless of how the substantially non-sulphurous combustion gas is produced, we find that preferred formation of the combustion gas should be controlled so that first, the $CO_2$ content of such combustion gas is not greater than 10.5% by volume and second, the temperature of the combustion gas is high enough to maintain the gas-vapor mixture in the reaction zone, e. g., as exiting the reaction zone thru the outlet such as 37 of the drawing, at temperature not less than 900° F. and not more than 1400° F. We have found that, especially in the utilization of substantially non-sulphurous combustion gas—substantially complete combustion of combustible constituents of the carbonaceous fuel prior to introduction of the combustion gas into the distillation zone, and provision of a combustion gas free oxygen content of not less than 7.5% by volume (dry basis) over and above the relative small amount of free oxygen needed to support oxidation of any organic impurities to $CO_2$—effects minimization of $SO_3$ dissociation. Since in practice with any given fuel it is more convenient to directly determine $CO_2$ content of a gas, it is preferred to control the oxygen content of the gas on basis of its $CO_2$ content. In this connection, a further practical advantage arises since, with any given fuel, we find further that a substantially non-sulphurous combustion gas of the indicated maximum 10.5% $CO_2$ content inherently contains the desired minimum free oxygen, i. e. 7.5% by volume, plus about 0.2–1% of free oxygen constituting an adequate supply of oxygen to support combustion of organic impurities to non-deleterious form, probably all $CO_2$.

Maintenance of reaction zone temperature of not less than 900° F., in conjunction with the inherent oxygen content needed to convert organic impurities to $CO_2$, causes oxidation of any organic impurities present to such an extent as to make possible the manufacture of a sulphuric acid product commercially acceptable as to color, and we find that temperatures not more than 1400° F. in any substantial portion of the distillation zone avoid tendency to dissociate $SO_3$ to $SO_2$ and oxygen by the action of heat alone. During operation of the apparatus shown on the drawing, temperature of the combustion gases at the point of entry into the distillation zone permissibly may be somewhat higher than 1400° F. and cause creation of a relatively small localized zone in which temperature is above 1400° F. However, we find heat absorption is so rapid that if fuel combustion is controlled so that the reading of a pyrometer, placed say at a point level with and diametrically opposite the combustion gas inlet, is kept at 1400° F. or less, there is no discernible dissociation of $SO_3$ to $SO_2$ and oxygen, and from practical viewpoint the effective temperature in the distillation zone is not above 1400° F.

Formation of a non-sulphurous combustion gas hot enough to keep the temperature of the reaction zone not less than 900° F. and having a composition entering the reaction chamber of not more than 10.5% $CO_2$ content can be done by any operator. On the basis of injection into the reaction chamber 11 of a given quantity of impure acid, and design of combustion chamber 12 such as to secure substantially complete combustion of carbonaceous fuel prior to introduction of the combustion gas into the reaction chamber 11, it will be understood that in order to decrease $CO_2$ content of the combustion gas, it is only necessary to increase the amount of air supplied to burner 14 by adjustment of valve 23. Determination of the $CO_2$ content of the combustion gas may be made at any convenient point in the system by means of standard gas analysis equipment. In a plant of the type shown it is generally more practical to control fuel combustion on the basis of continuous $CO_2$ analysis of the tail gas in stack connection 61. While the burner 14 on the drawing is shown as adapted to use of fuel oil, such burner may be replaced by one designed to burn natural or artificial fuel gas, in which case operating principles are the same as when employing oil.

By proceeding in accordance with the foregoing, there is formed, in pipe 40, a gas-vapor mixture in which upwards of 90–95% of the sulphur constituent of the acid fed into the reaction chamber thru spray 35 is in the form of $SO_3$. Since the $H_2SO_4$ containing liquors treated in accordance with disclosed process are ordinarily dilute, i. e. acid liquors containing less than 100% $H_2SO_4$, it will be understood that the hot gas-vapor mixture contains sufficient water to unite with the $SO_3$ on cooling to form liquid sulphuric acid. The gas-vapor mixture is passed thru a bed 42 of any suitable filtering material such as broken firebrick which functions to remove mechanically entrained solids such as residual iron and aluminum sulphates not deposited as solids on the bottom of the distillation chamber and to complete combustion or destruction of any organic material which may be carried in traces by the gas stream. The filtering operation is carried out preferably at temperature in excess of about 850° F. and at these temperatures, well above the condensation point of sulphuric acid, the filtering material appears to act as a catalyst to complete conversion of any organic matter present to a non-deleterious form.

The filtered gas-vapor mixture is then cooled to condense sulphuric acid in any way known in the art. For example, condensation may be effected in a packed tower 47 in which the gas-vapor mixture is contacted countercurrently with liquid sulphuric acid. In operation of the tower, the gas-vapor mixture may enter from pipe 44 at temperature of about 900–1000° F., residual gas and vapor leaving the top of the tower thru tail gas pipe 61 at temperature of about 300–330° F. The acid circulating system including cooler 56, pump 57, and tank 58 may be controlled so that the acid leaving the bottom of the tower thru pipe 52 is at temperature of about 460° F., and the acid entering the top of the tower thru the distributing head 60 may be at temperature of about 250–330° F. The $H_2SO_4$ strength of the product acid may be regulated as desired by suitable control of the contacting operation in the condenser. In one operation, when starting with a cloudy, grey spent acid resulting from manufacture of trinitrotoluene and containing approximately 92% $H_2SO_4$, 0.03% iron calculated as $Fe_2O_3$, and 0.002% of ether extractable bodies, we obtained a colorless condensed acid having an $H_2SO_4$ strength of 93.1% and containing 0.004% iron calculated as $Fe_2O_3$, and 0.0005% of ether extractable bodies. The $CO_2$ and $SO_2$ contents of the condenser tail gas were respectively 8.4% and 0.28% by volume. In another operation, when using a dark brown spent acid from trinitrotoluene manufacture and containing approximately 69% $H_2SO_4$, 0.019% iron calculated as $Fe_2O_3$, and 0.52% of ether extractable bodies, we obtained a slightly brown condensed acid having an $H_2SO_4$ strength of 93.1% and containing 0.006% iron calculated as $Fe_2O_3$, and 0.0058% of ether extractable bodies. The $CO_2$ and $SO_2$ contents of the condenser tail gas were respectively 8.4% and 0.46% by volume.

The particular distillation procedure described herein affords such a high yield of condensed acid of acceptable color, that it becomes commercially feasible to operate the distillation and condensation stages in connection with a plant for producing sulphuric acid by catalytic oxidation of $SO_2$ to $SO_3$. Such an operation, constituting a modification of the invention, differs from the previously described preferred embodiment principally in that hot $SO_2$ gas containing free oxygen is used as the heating medium in reaction chamber 11. For example, an $SO_2$ gas containing free oxygen may be produced by burning brimstone, in which case combustion chamber 12 and associated burner 14 of Fig. 1 of the drawing are replaced by a suitable sulphur burner not shown.

When using a combustion gas formed by burning sulphur containing materials it will be understood that in the formation of an $SO_2$-oxygen gas mixture, the previously described features regarding temperature and free oxygen content of the hot distilling gas likewise apply, that is, burning of the sulphur bearing material is controlled so that the resulting combustion gas is hot enough to maintain in the reaction chamber 11 above indicated temperature conditions, and also so that such $SO_2$ combustion gas contains preferably not less than 7.5% free oxygen, plus the relatively small amount of free oxygen needed to support oxidation of organic impurities to $CO_2$. On burning brimstone, combustion may be controlled to form an $SO_2$-oxygen gas hot enough to adequately fulfill temperature requirements in distillation chamber 11, and preferably to have a free oxygen content of about 10.5% by volume and corresponding $SO_2$ content of about 10.5% by volume. In operation of a brimstone burner along with the distillation and condensation stages of the drawing, free oxygen content of the $SO_2$ gas entering the bottom of the furnace 10 may be determined in any known way, and brimstone combustion regulated accordingly.

All of the $SO_2$ entering the distillation stage as a constituent of the combustion gas is present as $SO_2$ in the tail gas in outlet pipe 61 of condenser 47. Further, oxygen content of the condenser tail gas is normally sufficient to support catalytic oxidation of the $SO_2$ to $SO_3$ in a contact unit, but if not the oxygen deficiency may be supplied prior to conversion. Hence, gas from pipe 61 at temperature of about 300° F. is run thru line 64, and cooled in cooler 65 down to e. g. 100° F. to effect condensation and separation from the gas stream of most of the contained water which is discharged from the system thru pipe 67. The cooled gas stream is then passed thru a coke filter 68 to separate out acid mist, thence thru drying tower 69 and into the catalytic converter 70. $SO_3$ formed is contacted with concentrated sulphuric acid in absorber 71, and the resulting sulphuric acid product is drawn off thru outlet 72.

Hydrogen sulphide gas, such as the strong $H_2S$ gas obtained as a by-product in the treatment of cracking still gases in the petroleum industry, may also be used as a source of hot combustion gas. In this circumstance, operation is essentially the same as when burning brimstone. Control of burning of $H_2S$ in such manner so as to facilitate introduction into distillation chamber 11 of gas at proper temperature is simple and understood in the art. If, as is sometimes the case, the $H_2S$ gas used contains organic impurities, the organic impurity content of the $SO_2$ gas resulting from $H_2S$ combustion should be taken into consideration in adjusting the oxygen content of the gas entering the bottom of distillation chamber 11, that is, such $H_2S$ combustion gas should have preferably not less than 7.5% by volume of free oxygen plus sufficient oxygen to support oxidation to $CO_2$ of the organic impurities inherently contained in the $H_2S$ combustion gas, and also of any organic impurity in the acid being treated. Formation of a combustion gas, by burning of $H_2S$, of the composition preferred for introduction into the bottom of distillation chamber 11 ordinarily automatically provides a condenser tail gas containing adequate oxygen for catalytic oxidation of the tail gas $SO_2$ to $SO_3$. In an unusual instance where the oxygen content of the condenser tail gas is not high enough, more air may be introduced into the contact system thru an air inlet 75 connected to line 64.

We claim:

1. The method for producing sulphuric acid which comprises disseminating in a reaction zone sulphuric acid containing organic impurities (determined as carbon) in amount not in excess of 1.5% by weight, introducing hot gas into said zone and into direct contact with the disseminated acid therein, controlling formation of said gas so that (1) the free oxygen content of said gas is not less than 7.5% by volume in addition to sufficient free oxygen to support oxidation to non-deleterious form of all organic impurities present, and (2) the temperature of said gas is high enough to maintain temperature in the reaction zone not less than 900° F. and not more than 1400° F., effecting during the reaction and while in suspension in the hot gas substantially complete volatilization of all liquid fed to the reaction zone, and regulating supply of reactants to said zone so that the reaction products as discharged from the reaction zone contain, as $SO_2$, upwards of 90% of the sulphur constituent of the acid fed into the reaction zone.

2. The method for producing sulphuric acid which comprises disseminating in a reaction zone sulphuric acid containing organic impurities (determined as carbon) in amount not in excess of 1.5% by weight, introducing hot gas into said zone and into direct contact with the disseminated acid therein, controlling formation of said gas so that (1) the free oxygen content of said gas is not less than 7.5% by volume in addition to sufficient free oxygen to support oxidation to non-deleterious form of all organic impurities present, and (2) the temperature of said gas is high enough to maintain temperature in the reaction zone not less than 900° F. and not more than 1400° F., effecting during the reaction and while in suspension in the hot gas substantially complete volatilization of all liquid fed to the reaction zone, regulating supply of reactants to said zone so the reaction products as discharged from the reaction zone contain, as $SO_3$, upwards of 90% of the sulphur constituent of the acid fed into the reaction zone, discharging from said zone reaction products containing $SO_3$ and sufficient water to form sulphuric acid by condensation, and contacting such products, at temperature not less than the order of 850° F. with a body of liquid sulphuric acid under conditions to effect union of $SO_3$ and water to produce sulphuric acid substantially free of organic impurities.

3. The method for producing sulphuric acid which comprises disseminating in a reaction zone sulphuric acid containing organic impurities (determined as carbon) in amount not in excess of 1.5% by weight, burning carbonaceous fuel to form hot gas, introducing said gas into said zone and into direct contact with the disseminated acid therein, controlling formation of said gas so that (1) substantially complete combustion of carbonaceous combustible constituents to $CO_2$ is effected, (2) the $CO_2$ content of said gas is not more than 10.5% by volume, and (3) the temperature of said gas is high enough to maintain temperature in the reaction zone not less than 900° F. and not more than 1400° F., effecting during the reaction and while in suspension in the hot gas substantially complete volatization of all liquid fed to the reaction zone, and regulating supply of reactants to said zone so that the reaction products as discharged from the reaction zone contain, as $SO_3$, upwards of 90% of the sulphur constituent of the acid fed into the reaction zone.

4. The method for producing sulphuric acid which comprises spraying denitrated spent sulphuric acid from the manufacture of trinitrotoluene and containing organic impurities (determined as carbon) in amount not in excess of 1.5% by weight into the lower end of a vertically disposed reaction chamber having a gas-vapor outlet at the top, burning carbonaceous fuel to form hot gas, introducing said gas into the lower end of said chamber and into direct contact with the disseminated acid therein, controlling formation of said gas so that (1) substantially complete combustion of carbonaceous combustible constituents to $CO_2$ is effected, (2) the $CO_2$ content of said gas is not more than 10.5% by volume, and (3) the temperature of said gas is high enough to maintain temperature in the reaction chamber not more than 1400° F., and not less than 900° F. at the same gas-vapor outlet, effecting during the reaction and while in suspension in the hot gas substantially complete volatilization of all liquid fed to the reaction chamber, and regulating supply of reactants to said zone so that the gas-vapor mixture as discharged from the reaction chamber contains, as $SO_3$, upwards of 90% of the sulphur constituent of the acid fed into the reaction zone.

5. The method for producing sulphuric acid which comprises disseminating in a reaction zone sulphuric acid containing organic impurities (determined as carbon) in amount not in excess of 1.5% by weight, burning sulphur bearing material to form hot gas, introducing said gas into said zone and into direct contact with the disseminated acid therein, controlling formation of said gas so that (1) the free oxygen content of said gas is not less than 7.5% by volume in addition to sufficient free oxygen to support oxidation to non-deleterious form of all organic impurities present, and (2) the temperature of said gas is high enough to maintain temperature in the reaction zone not less than 900° F. and not more than 1400° F., effecting during the reaction and while in suspension in the hot gas substantially complete volatilization of all liquid fed to the reaction zone, regulating supply of reactants to said zone so that the reaction products as discharged from the reaction zone contain, as $SO_3$, upwards of 90% of the sulphur constituent of the acid fed into the reaction zone, discharging from said zone reaction products containing $SO_3$ and sufficient water to form sulphuric acid by condensation, cooling said reaction products to effect union of $SO_3$ and water to produce sulphuric acid and residual gas containing $SO_2$, and catalytically oxidizing said $SO_2$ to $SO_3$.

HENRY F. MERRIAM.
ANDREW M. HARKNESS.